United States Patent
Nachtsheim et al.

(10) Patent No.: US 6,195,928 B1
(45) Date of Patent: Mar. 6, 2001

(54) SIGNALING AND SUPPORT DEVICE FOR FISHING

(76) Inventors: George L. Nachtsheim; Steven L. Nachtsheim, both of 3897 S. Jason St., Englewood, CO (US) 80110

(*) Notice: Subject to any disclaimer, the term of this patent is extended or adjusted under 35 U.S.C. 154(b) by 0 days.

(21) Appl. No.: 09/224,517

(22) Filed: Dec. 31, 1998

(51) Int. Cl.$^7$ .................................................. A01K 97/12
(52) U.S. Cl. ................................. 43/4.5; 43/17; 43/21.2
(58) Field of Search .............................. 43/17, 16, 21.2, 43/4.5

(56) References Cited

U.S. PATENT DOCUMENTS

| | | |
|---|---|---|
| D. 281,805 | 12/1985 | Bolinger . |
| 2,302,337 | 11/1942 | Mantell . |
| 2,741,055 | * 4/1956 | Weber, Jr. . |
| 3,879,884 | * 4/1975 | Tucker, Sr. ........................ 43/42.72 |
| 3,913,255 | * 10/1975 | Fillmen .................................. 43/17 |
| 4,794,719 | 1/1989 | Rabino . |
| 4,908,973 | * 3/1990 | Perks ..................................... 43/17 |
| 5,038,511 | * 8/1991 | Gessner ............................... 43/21.2 |
| 5,228,228 | 7/1993 | Meissner . |
| 5,261,180 | 11/1993 | Foster et al. . |
| 5,396,726 | 3/1995 | Zepeda, Sr. . |
| 5,570,532 | * 11/1996 | Shaffer ................................... 43/17 |

FOREIGN PATENT DOCUMENTS

9479064 * 6/1996 (AT) .

* cited by examiner

Primary Examiner—Jack W. Lavinder
(74) Attorney, Agent, or Firm—Ramon L. Pizarro; Edwin H. Crabtree

(57) ABSTRACT

A support for use with a fishing rod having at least one line guide and a reel with fishing line. The support includes a base with a first end and a second end, a signaling device that supports the fishing line and provides a signal once the fishing line is released. The signaling device being supported on the base at a location between the first end of the base and the second end of the base. The support will also include a support for holding a fishing rod over the base, near the second end of the elongate member, so that fishing line from the fishing rod is accepted by the signaling device and extends from the reel of the fishing rod, down to the signaling device and back up to the line guide of the fishing rod, so that upon release of the fishing line from the signaling device the fishing line extends directly from the reel and on to the line guide of the fishing rod.

20 Claims, 2 Drawing Sheets

SIGNALING AND SUPPORT DEVICE FOR FISHING

BACKGROUND OF THE INVENTION (a) Field of the Invention

This invention generally relates to a system for providing a signal to indicate that a fish has taken the fishing line while fishing with a rod and reel. More particularly, but not by way of limitation, to a device for holding a fishing rod and providing a signal when a fish takes the line.

(b) Discussion of Known Art

In the sport of ice fishing a fisherman will walk to a location over a frozen body of water and drill a hole through the ice to access the liquid water below the ice. As is expected, the water in the lake or area being is much colder than during summer months, and may even be at or very close to freezing temperatures. Because of the low temperatures of the water, the activity of the fish that inhabit the lake will have slowed down significantly due to the fact that fish are cold blooded animals. The low activity or almost lethargic state of fish in these waters makes detection of nibbling or similar fish activity very difficult. The fish may simply take the bait in their mouths and gently hold it there until they garner enough appetite or desire to actually bite down on or swallow the bait. Accordingly, this activity is nearly undetectable to the fisherman waiting on the ice above. Moreover, the fact that the fish do not bite down on the bait, but merely hold it in their mouths and then gently drift or move away from the location where found the bait, it is important to note that any sudden pull or jerk of the line will cause the bait, together with the hook, to fall out of the fish's mouth. Of course, this will mean that the fisherman will have missed the opportunity to let the fish take the bait and hook deeper into its mouth, to a location where the fisherman can finally set the hook and begin reeling the fish in.

There are a number of devices which produce some sort of signal when the fish has struck. Typically, these devices rely on the sharp tug that is experienced when a fish takes the bait under normal conditions. Under "normal conditions" being at times when the water is not cold enough to cause fish activity to slow down. Under these conditions the fish will eagerly take the bait to keep the bait food from other fish who may also be competing for food. This kind of activity results in vigorous tugging on the fishing line. The tugging is used to activate alarm mechanisms such as the signaling device taught in U.S. Pat. No. 2,302,337 to Mantell. The Mantell device produces flashing signals in response to the flexing of the fishing rod caused by the vigorous tugging of the fish.

Many other devices use systems that mount on the fishing rod itself and which can disturb the weight distribution of the fishing rod and reel combination. Additionally, attachment directly to the rod can lead to fouling of the line while casting or reeling the line in. Examples of devices that attach to the rod are shown in U.S. Pat. No. 4,794,719 to Rabino, U.S. Pat. No. 5,228,228 to Meissner, U.S. Pat. No. 5,261,180 to Foster et al., U.S. Pat. No. 5,396,726 to Zepeda, Sr., Des. U.S. Pat. No. 281,805.

A review of these devices reveals that there remains a need for a device that aids fishermen in knowing when a fish is grasping or playing with the bait, the device not being mountable on the fishing rod itself, thereby preventing the fouling or imbalance of the fishing tackle.

There remains a need for a system that allows fishermen, and particularly ice fishermen, to detect when a fish is taking the bait. There remains a need for a device that allows the fish to gently grasp the bait, then swim away with the bait, while providing a signal to the fisherman that the fish is swimming away with the bait.

There remains a need for a signaling device that provides a signal without requiring that the fish tug vigorously on the fishing line.

There remains a need for a signaling device that allows the fish to swim away with the baited line while providing a signal as the fish swims away, and thus allowing the fisherman the opportunity to decide when to tug on the line to sink the hook into the fish's mouth.

Still further, there remains a need for a signaling device that does not require modification or attachment to the fishing pole or rig.

SUMMARY

It has been discovered that the problems left unanswered by known art can be solved by providing a rod support frame which includes:

- a fishing rod support portion with a rod mounting portion; and
- a signaling device mounted near the rod support portion, the signaling device releasably holding fishing line and having an alarm that responds to the release of the fishing line. The signaling device being mounted next to so that fishing line from a rod held in the rod support portion may extend through from the rod and on to the signaling device before extending towards the remainder of the rod and into the water.

In a preferred embodiment of the invention the support portion includes a frame having an elongated base, which in a highly preferred embodiment consists of an elongated member. The elongated member will preferably include a first end and a second end. The first end of the elongated member will preferably include at least one leg which is preferably pivotally attached to the first end of the elongated member. It is further contemplated that in a commercial embodiment of the invention the elongated member is simply an elongated section of rod and the leg is simply another section of rod that is pivotally fastened to the first end of the elongated body.

The second end of the elongated body will preferably include a fishing rod support, which in a preferred embodiment includes a sleeve or slot that accepts the handle portion of a fishing rod, as to support the rod and reel together over the elongated member.

In a preferred embodiment of the invention the signaling device includes a body that includes a spring loaded set of contacts that can hold the fishing line between the two contacts. The spring loaded feature of the contacts allows the placement of the fishing line between the contacts to create and open electrical circuit, which will then close as soon as the fishing line is removed from between the contacts and the contacts touch one another. The spring loaded contacts will preferably include a resilient support for one electrical contact and an adjusting device adjusting the amount of spring load or bias imposed by the resilient support. Moreover, according to a highly preferred embodiment of the invention the contacts will be of a generally spherical shape, which will enhance the ease with which the line is removed from between the contacts.

Preferably, the signaling device will be supported by the fishing rod support or base at a location near the reel of the fishing rod. Most preferably, the signaling device will be placed along the elongated member of the base, between the first end and the second end of the elongated member. This arrangement will allow the spool of the fishing reel to left in an open, or free wheeling position, such that the reel provides little or no resistance to the removal of line from the reel when a fish begins to swim away with the bait. Thus, the line is held at a desired location relative to the reel by the signaling device, and is easily released from the signaling device in response to a very gentle tug by a fish. The signaling device will produce an audible or other signal once the line is released. The release of the line will leave spool in the fully open or release position, allowing the line to be released from the spool with little or no resistance.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
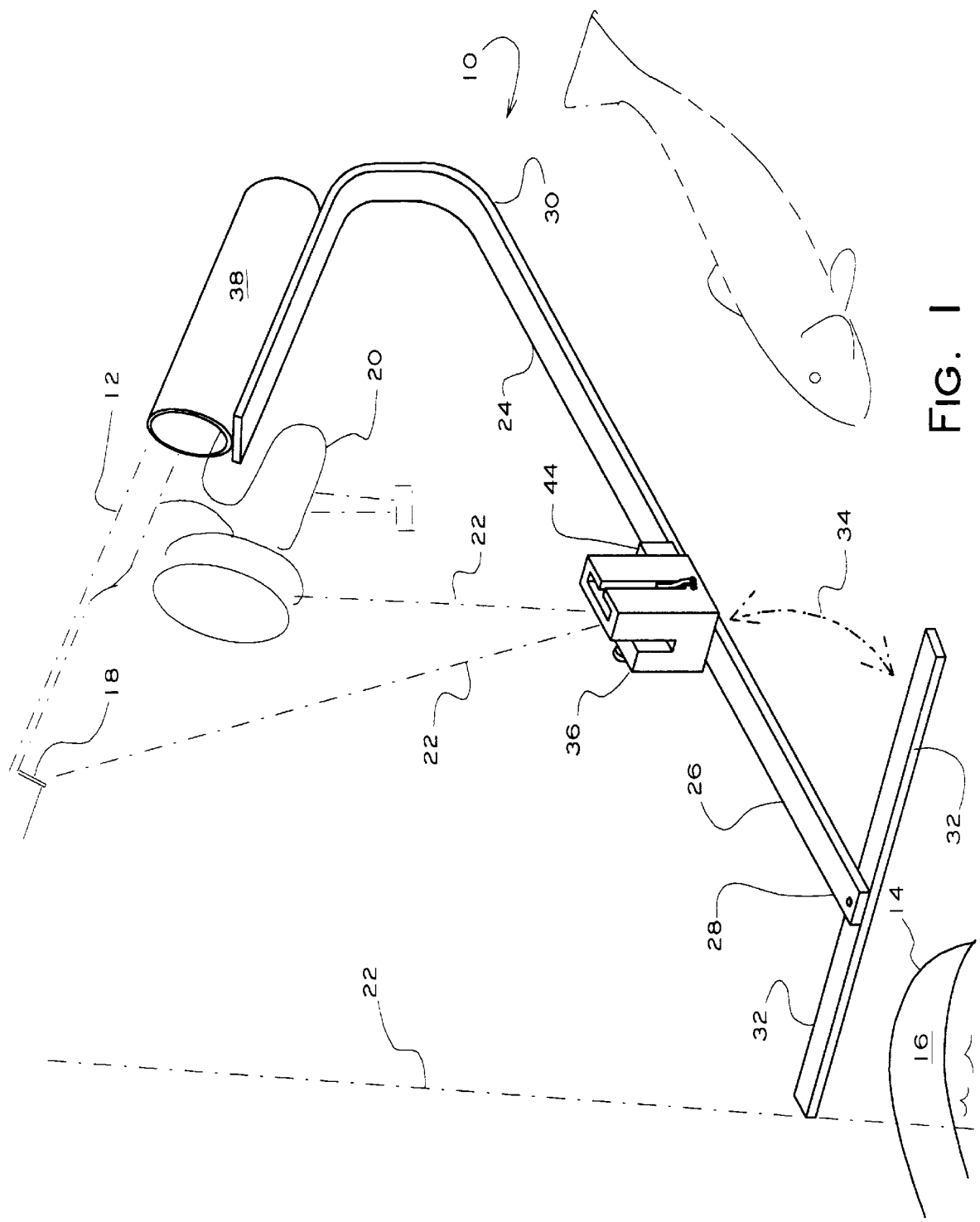
FIG. 1 is a perspective view of a highly preferred embodiment of the invention as used while fishing through a hole in the ice.

Turning now to FIG. 1 where a support 10 for use with a fishing rod 12 has been illustrated while supporting the fishing rod 12 next to an opening 14 in a section of ice 16 over a body of water. The fishing rod has been illustrated as having at least one line guide 18 and a reel 20 with fishing line 22. The support 10 includes a base 24 that, in a preferred embodiment, will include an elongated member 26 with a first end 28 and a second end 30.

According to a highly preferred embodiment of the invention the first end 28 of the elongated member 26 includes at least one leg 32 which is pivotally attached to the first end 28 of the elongated member 26. In a highly preferred embodiment of the invention the leg 32 will be positioned at the first end 28 such that the elongated member 26 approximately bisects the leg 32. Additionally, the leg 32 will be pivotally attached to the elongated member 26, so that the leg 32 is pivotable from a first position, shown on FIG. 1. (In the first position the leg 32 is substantially perpendicular to the elongated member 26.), to a second position where the leg 32 is pivoted in the direction of arrow 34 to a position where it is aligned with, or substantially parallel to, the elongated member 26. This arrangement will allow the support 10 to collapse to allow easy storage of the device. Clearly, it is contemplated that the support could be of a generally flat, one piece, construction. However, this would present disadvantages in the stowability of the device.

Figure 2:
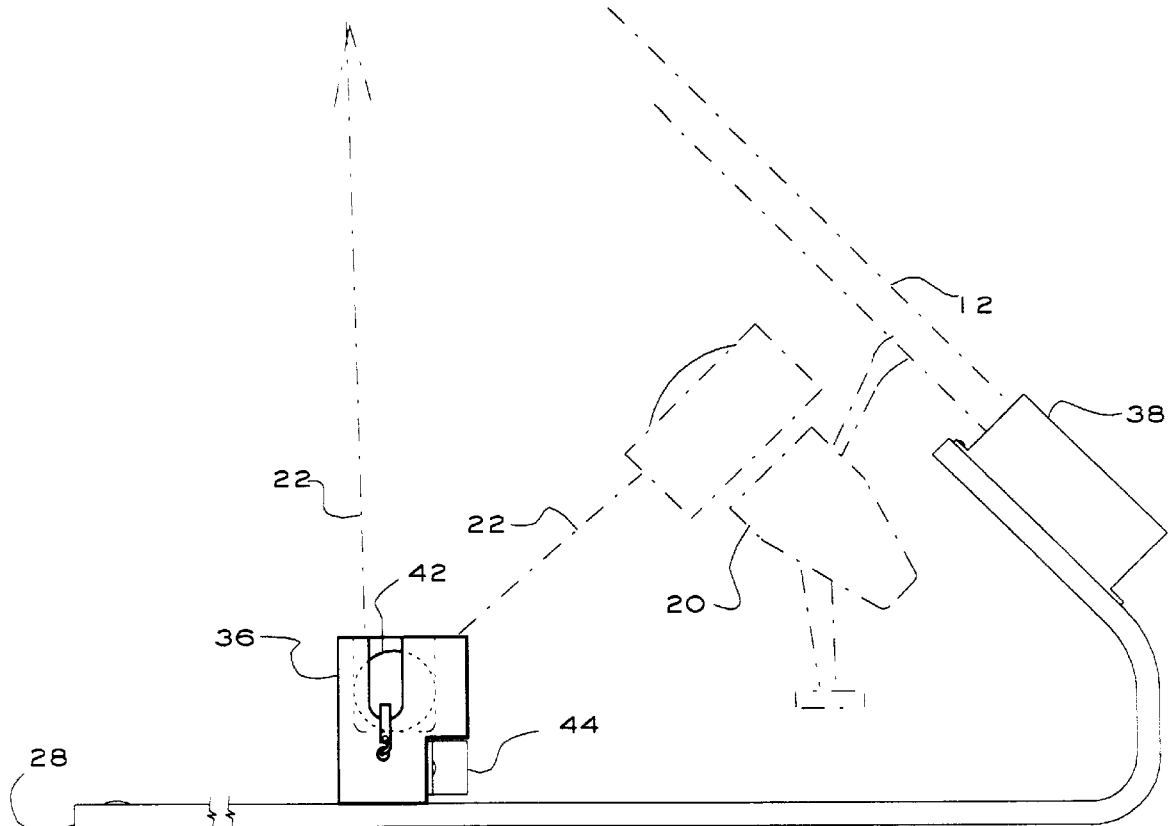
FIG. 2 is a side view of the invention while supporting a fishing rod and reel (in dashed lines). The view illustrates the routing of the fishing line from the reel, through the signaling device and back towards the line guides on the rod.

Turning now to FIGS. 1 and 2, it will be understood that in a preferred embodiment of the invention, a signaling means 36 which serves to support the fishing line 22, to provide a signal and to release the fishing line 22 in response to movement of very slight tugging of the fishing line 22 is mounted on the base 24 at a location between the first end 28 of the elongated member 26 of the base 24 and the second end 30 of the elongated member 26 of the base. The second end 30 of the elongated member 26 will preferably include a means 38 for supporting the fishing rod 12 over the base 24. Most preferably, the means 38 for supporting the fishing rod 12 over the base 24 will support the fishing rod 12 such that the fishing rod 12 and elongated member 26 will be generally coplanar.

Also shown in FIGS. 1 and 2 is that it is preferred that the signaling means 36 will be mounted in a generally coplanar position relative to the rod 12 and the elongated member 26, at a location near the reel 20 of the fishing rod 12. As indicated on FIG. 2, the position of the signaling means will be such that the signaling means 36 will lie below the fishing rod 12 when the fishing rod 12 is mounted in the means 38 for supporting the fishing rod 12. In a highly preferred embodiment, the means 38 will consist of simple cylindrical portion that extends from the second end 30 of the elongated member 26 and that can accept the fishing rod 12.

As illustrated in FIG. 2, the support of the fishing rod 12, together with the reel 20 over the elongated member 26 will allow the fishing line 26 from the reel 20 to extend from the reel 20, down to the signaling means 36, and then back up to the line guide 18. This routing will enable the fishing line 22 to be released from the signaling means 36 and allow the fishing line 22 to be delivered from the reel 20 on to the line guide 18 of the fishing rod 12, so that after a fish has pulled on the fishing line 22, the fishing line 22 may be delivered without passing through the signaling means 36.

Figure 3:
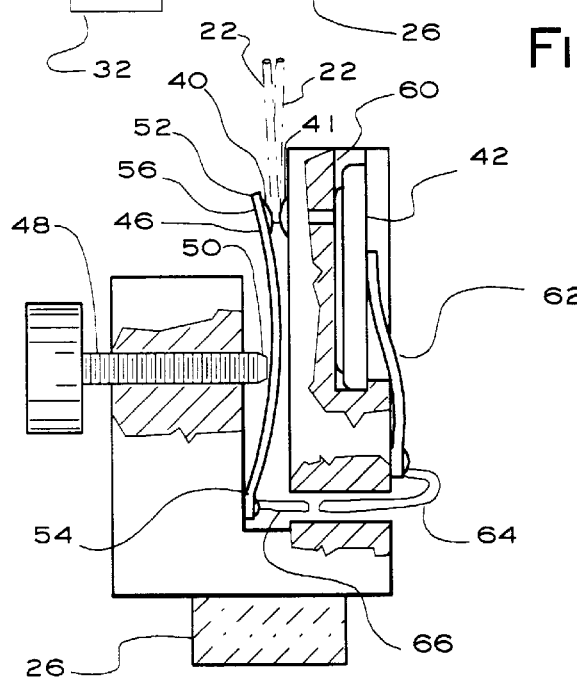
FIG. 3 is an end view of the signaling device. The view is taken looking from the first end of the elongated member of the base towards the second end.
Figure 4:
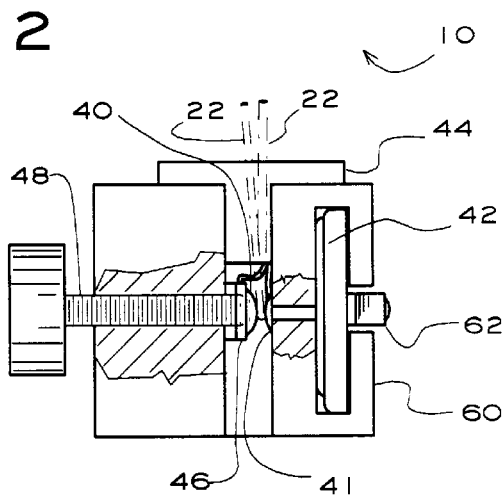
FIG. 4 is a top, plan view of the signaling device. The view looking down on the view shown on FIG. 3.
Figure 5:
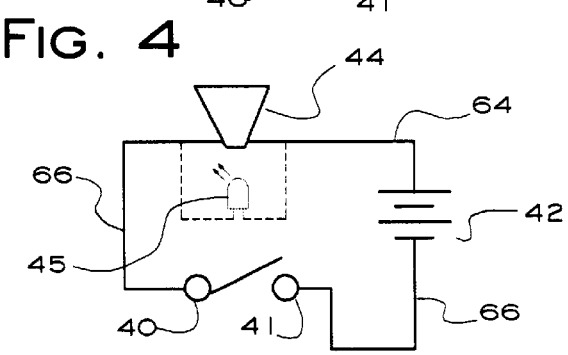
FIG. 5 is a schematic diagram illustrating the circuitry used in the preferred embodiment of the signaling device of the invention.

Turning now to FIGS. 3–5 where the signaling means 36 has been illustrated in greater detail, it will be understood that the signaling means 36 will preferably include a contact switch, or set of contacts 40 which serve to open or close an electrical circuit that activates the signaling means 36. Thus, as shown on FIG. 5, the electrical circuit of a highly preferred embodiment of the invention includes a battery 42, preferably a disk shaped 3v lithium battery, which is connected to a buzzer 44 and to the contacts 40, such that closure of the contacts 40 completes the circuit to the buzzer 44. It is important to note that while the preferred embodiment of the invention includes a buzzer 44 to alert the user that the line has been taken, it is also contemplated that an LED 45 may by incorporated into the system to allow visual inspection of whether the line has been taken. Clearly, it is also contemplated that other systems may be used to convey to the fisherman that the line has been removed from between the contacts.

As shown on FIGS. 3 and 4, the contacts 40 will be of a generally spherical shape and include means for squeezing the fishing line 22 between two contacts 40 to separate the two contacts 40 and open the circuit to the buzzer 44. It is important to note that the squeezing force on the fishing line 22 should be a minimal amount of force such that the line 22 is easily released from between the contacts 40 in response to the slightest tugging of the fishing line 22. Thus the generally spherical shape of the contacts 40 allow the line to be held between the point of tangency of the contacts. This will provide a very small area of contact between the contacts 40 and the fishing line 22 as the fishing line is held between the contacts 40. Additionally, the curvature of the contacts 40 will introduce a degree instability to the stack-up, since the fishing line 22 is also likely to have a rounded perimeter. Thus, the instability of the stack-up causes the contacts to essentially eject the line 22 from between the contacts 40 once the line 22 is moved slightly away from the point of tangency of the contacts 40. Clearly, it is contemplated that the spherical surface may be incorporated on to only one of the two contacts 40, but it is preferred that both contacts will include generally spherical surfaces.

As shown on FIG. 3, to gently hold or squeeze the line between the two contacts 40, it is preferred that at least one of the contacts be mounted on a spring 46. The amount of bias force imposed by the spring 46 on to the contacts 40 can be varied by turning the adjustment screw 48, which serves as and adjusting means and increases the amount of spring deflection depending on the location of the end 50 of the screw 48. In a highly preferred embodiment of the invention the spring 46 consists of a leaf spring 52 with a first end 54 and a second end 56. The first end 54 of the leaf spring 52 is fixed, while the second end 56 is free and supports the spherical contact 40. The screw 48 in this embodiment contacts the spring 52 between the first end 54 and the second end 56, so that the amount of deflection or bias imposed on the spring can be controlled by tightening or loosening of the screw 48. It is important to note that it is contemplated that the spring 46 may be made of a plastic material, with the contact being of a conductive material attached to the spring. Also, it is contemplated that the spring may be a helical or similar type spring that is attached to the end of the screw 48, and the contact being attached to the spring so that tightening of the screw will compress the spring as it forces the contact to bear against the opposing contact 40.

Turning now to FIGS. 2 and 4 it will be understood that the battery 42 of a preferred embodiment will be held in a slot shaped housing 60 which includes a contact 62 that is connected to positive lead wire 64 that is also connected to the buzzer 44. The negative lead wire 66 will extend from the buzzer 44 and be electrically connected to the contact 40 mounted on the spring 46. To close the circuit opposing contact 41 is mounted near the contact 40, and is electrically connected to the opposite pole of the battery 42.

Thus, in operation, the user will drop the hook and bait into the opening 14 in the ice 16 until the bait is at a depth where fish are suspected to be feeding. Then the fisherman will insert the handle of the fishing rod into the means 38 for supporting a fishing rod, and place the fishing line 22 between the contacts 40 and 41. The fisherman will then adjust the pressure between the contacts until the line is barely supported between the contacts. Once a fish takes the bait and begins to swim away with the bait, the line will be released from between the contacts at the first instance of the slightest pull or tug by the fish. Once the line is released the buzzer 44 will sound, and the line will be allowed to escape freely from the reel 20, until the fisherman decides to lock the reel, stop the line, or start reeling in the line to set the hook.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A support for use with a fishing rod having at least one line guide and a reel with fishing line, the support comprising:

a base having a first end and a second end;
a signaling means for supporting the fishing line by directly contacting the fishing line, providing a signal and releasing the fishing line in response to tugging of the fishing line, said signaling means being supported on said base at a location between the first end of the base and the second end of the base, said signaling means having a generally spherical clamping surface adapted for supporting the fishing line by providing direct contact of the spherical clamping surface against the fishing lines at a point along the fishing line and for establishing an electrical contact to activate the signaling means; and
means for supporting a fishing rod over said base, said means for supporting a fishing rod being attached to said base, near the second end of the base, so that fishing line from said fishing rod accepted by the signaling means extends from the reel of the fishing rod, down to the signaling means and back up to the line guide of the fishing rod, so that upon release of the fishing line from said signaling means the fishing line extends directly from the reel and on to the line guide of the fishing rod.

2. A support according to claim 1 wherein said base comprises an elongated member having a first end and a second end.

3. A support according to claim 2 wherein said base further comprises at least one leg pivotally attached to the first end.

4. A support according to claim 1 wherein said clamping surface adapted for supporting the fishing line in said signaling means comprises a second generally spherical surface to create a pair of generally spherical surfaces that are biased against one another for contacting the fishing line along a point on the fishing line.

5. A support according to claim 4 and further comprising means for adjusting a force for squeezing the fishing line in said signaling means.

6. A support according to claim 1 wherein said base comprises and elongated member.

7. A support according to claim 6 wherein said elongated member further comprises at least one leg pivotally attached to said first end, so that the leg is movable between a first position where the leg extends transversely to the elongated member and a second position where the leg is generally parallel to the elongated member.

8. A support for use with a fishing rod having at least one line guide and a reel with fishing line, the support comprising:

a base having an elongated member having a first end and a second end;

a signaling means for supporting the fishing line and providing a signal and releasing the fishing line in response to movement of the fishing line, said signaling means being supported on said base at a location between the first end of the base and the second end of the base, said signaling means having a generally spherical clamping electrical contact surface adapted for supporting the fishing line at a point along the fishing line; and means for supporting a fishing rod over said base, said means for supporting a fishing rod being attached to said base, near the second end of the elongated member, so that fishing line from said fishing rod accepted by signaling means extends from the reel of the fishing rod, down to the signaling means, separating the spherical clamping electrical contact surface and back up to the line guide of the fishing rod, so that a tug on the fishing line will disturb the position of the spherical clamping electrical contact surface and release the fishing line and close an electrical circuit and, so that upon release of the fishing line from said signaling means the fishing line extends directly from the reel and on to the line guide of the fishing rod.

9. A support device according to claim 8 wherein said means for supporting a fishing rod extends over said signaling means.

10. A support device according to claim 8 wherein said signaling means comprises a contact switch comprising means for squeezing the fishing line between two spherically shaped electrical contacts to separate the two contacts while supporting the fishing line at a point along the fishing line.

11. A support device according to claim 10 wherein means for squeezing the fishing line between two contacts comprises a spring connected to an adjusting means, the spring supporting at least one of the generally spherical contact surfaces, so the squeezing force of the contacts on the fishing line can be adjusted with the adjusting means and so that the support of the fishing line between the contacts will be generally unstable, so that a gentle tug on the fishing line will cause the fishing line to move away from the generally spherical surface.

12. A support device according to claim 11 wherein said elongated member of said base further comprises at least one leg pivotally attached to said first end, so that the leg is movable between a first position where the leg extends transversely to the elongated member and a second position where the leg is generally parallel to the elongated member.

13. A support device according to claim 11 wherein said spring means comprises a leaf spring having a first end and a second end, the first end of the leaf spring being fixed, the second end being free, the contact being supported from said second end, said adjusting means being an adjusting screw contacting the leaf spring between the first end and the second end of the leaf spring, so that the squeezing pressure can be varied by turning the adjusting screw.

14. A support device according to claim 8 wherein said elongated member of said base further comprises at least one leg pivotally if attached to said first end, so that the leg is movable between a first position where the leg extends transversely to the elongated member and a second position where the leg is generally parallel to the elongated member.

15. A method for supporting a fishing line extending from a fishing rod having at least one line guide and a reel with fishing line, the method comprising:

providing a support comprising:

base having an elongated member having a first end and a second end, the first end having at least one leg pivotally attached to the first end;

a signaling means for supporting the fishing line and providing a signal and releasing the fishing line in response to movement of the fishing line, said signaling means being supported on said base at a location between the first end of the base and the second end of the base, said signaling means having a generally spherical clamping surface adapted for supporting the fishing line at a point along the fishing line and for providing an electrical contact to activate the signaling means; and means for supporting a fishing rod over said base, said means for supporting a fishing rod being attached to said base, near the second end of the elongated member;

inserting the fishing line from said fishing rod between the spherical clamping surface of the signaling means to support the fishing line from the reel of the fishing rod, so that a pull on said fishing line causes the fishing line to from between the spherical clamping surface to facilitate the release of the fishing line from said signaling means and causing the fishing line to extend directly from the reel and on to the line guide of the fishing rod.

16. A method according to claim 15 wherein said means for supporting a fishing rod extends over said signaling means.

17. A method according to claim 16 wherein said signaling means comprises a contact switch comprising means for squeezing the fishing line between two contacts to separate the two contacts.

18. A method according to claim 17 wherein means for squeezing the fishing line between two contacts comprises a spring connected to an adjusting means, the spring supporting the generally spherical clamping surface, so the squeezing force of the contacts on the fishing line can be adjusted with the adjusting means and so that the support of the fishing line between the contacts will be generally unstable, so that a gentle tug on the fishing line will cause the fishing line to move away from the generally spherical surface.

19. A method according to claim 17 wherein said elongated member of said base further comprises at least one leg pivotally attached to said first end, so that the leg is movable between a first position where the leg extends transversely to the elongated member and a second position where the leg is generally parallel to the elongated member.

20. A method according to claim 19 wherein said spring means comprises a leaf spring having a first end and a second end, the first end of the leaf spring being fixed, the second end being free, the contact being supported from said second end, said adjusting means being an adjusting screw contacting the leaf spring between the first end and the second end of the leaf spring, so that the squeezing pressure can be varied by turning the adjusting screw.

* * * * *